United States Patent Office 3,679,458
Patented July 25, 1972

3,679,458
PRESSURE SENSITIVE ADHESIVE TAPE
Henry P. Sorell, Arlington Heights, Eugene Pomazak, Lindenhurst, and Sven Rygg, Glenview, Ill., assignors to Borden Inc., New York, N.Y.
Filed June 23, 1970, Ser. No. 49,046
Int. Cl. C09j 7/04
U.S. Cl. 117—68.5                          2 Claims

ABSTRACT OF THE DISCLOSURE

A release coating for pressure sensitive adhesive tape prepared by admixing an organic titanate with a polysiloxane having hydroxyl groups to form a reaction product of said siloxane and titanate in an aromatic solvent and further admixing with said reaction product in aromatic organic solvent solution a (higher) alkyl compound having an active hydrogen atom or a polymer having active hydrogen atoms containing a major proportion of such alkyl compound polymerized therein. The solvent is evaporated to leave the release coat of this invention which is used on pressure sensitive tapes.

---

This invention relates to release coat compositions for use on pressure sensitive tapes and methods for making such release coats. The release coatings described in this invention are suitable for use with all the normal types of pressure sensitive adhesives such as silicone, natural or synthetic rubber, acrylics and polyvinyl methyl ethers. These novel type release coatings are particularly suited to those tapes used in electrical applications where the tape is wrapped upon its own backing. In this type of application the use of these release coats on tapes gives a flag resistance wrap and by means of exposure to elevated temperatures, the pressure sensitive adhesive especially the thermosetting types will bond to the release coating.

BACKGROUND OF THE INVENTION

Release coats normally used with all types of pressure sensitive adhesives, except silicone pressure sensitive adhesives, are either based on dimethylpolysiloxane cross-linked with methyl hydrogen polysiloxane or are based on high molecular weight organopolymers and copolymers having long straight chain alkyl side branching such as described in U.S. Patent 2,532,011 and U.S. Patent 3,342,625.

These release coatings give good release but for many applications are not resistant to flagging i.e. separation from underlying layers of the tape when wrapped upon itself, and give poor results when thermosetting to backing is required, as is necessary in many electrical applications.

For the use with silicone pressure sensitive adhesives, U.S. Patent 2,732,318 describes the use of a dried coating of an ortho titanate ester of general formula $Ti(OR)_4$. The titanate ester type of release coat has limited uses due to poor anchorage on many substrates which causes the release coat to transfer and destroy the tack of the pressure sensitive adhesive. Their use is restricted to the relatively non-aggressive silicone pressure sensitive adhesives based on dimethylsiloxane type polymers. With the advent of hydrocarbon substituted silicone adhesives such as those described in U.S. Patent 2,736,721 and 2,814,601 better release systems were required. One such system is described in U.S. Patent 3,050,411 and is based on a perfluoroalkylsiloxane cross-linked with methyl hydrogen polysiloxane. The perfluoroalkylsiloxane release coatings work well with the aggressive silicone pressure sensitive adhesives but do not perform well with other types of pressure sensitive adhesives.

DETAILED DESCRIPTION

The release coating composition of this invention gives good results with all types of silicone pressure sensitive adhesives and with other organic types of pressure sensitive adhesives. The new release coatings perform the normal functions of release coats described in the prior art such as high melting point, prevention of migration, strong anchorage to tape backings, and good unwind at normal environmental storage conditions (up to 140° F.) In addition these release coatings have the additional advantage of being resistant to flagging when the tape is wrapped upon itself both at room and elevated temperature, and upon curing at temperatures higher than obtained under normal storage conditions.

The release coating contains a hydroxyl terminated polysiloxane, or simply silicone, varnish reacted with an excess of titanate ester and further reacted with a long chain (higher) alkyl compound having an active hydrogen group (OH, $NH_2$, NH, COOH) or a polymer having polymerized therein as a major portion of such (higher) alkyls.

The release coats are most conveniently prepared in dilute aromatic solvent solutions. The stoichiometric excess of the titanate ester is added rapidly to a vigorously agitated dilute solution of the silicone varnish. Slow addition, or addition of the titanate to a high solids solution of the silicone varnish generally results in undesirable gelation. The silicone in the varnish should be reacted with a titanate ester without promoting cross-linking of the silicone in the varnish. The amount of titanate ester should be such that the total number of (OR) groups in the titanate ester are sufficient to react with substantially all the hydroxyl groups in the polysiloxane. Thus a ratio of at least 1:1:1 and preferably about 1.2 to 1.3 (OR) titanate groups per hydroxyl group in the siloxane is suitable. The concentration of the polysiloxane in the aromatic organic solvent is preferably from about 5% to 20% and the titanate is added to the polysiloxane varnish. The aromatic solvent can be any of the conventional aromatic solvents such as benzene, toluene, xylene and the like. In contacting the polysiloxane in the aromatic solvent, i.e. the varnish, care should be taken not to form substantial quantities of gel and preferably gel formation should be visibly absent. The reaction of the polysiloxane and titanate is preferably conducted at room temperature although higher or lower temperatures can be employed. To the reaction product of the polysiloxane and titanate in the organic solvent there is then added from about 2 to 25%, based on solids in the organic solvent of such reaction product, of the higher alkyl compound or polymer. Preferably from about 8 to 20% of such alkyl (or polymer thereof) is added and particularly from about 12% to 16% thereof.

Illustrative of the (higher) alkyl compounds or polymers thereof, there can be mentioned: polyvinyl N-octadecyl carbamate; polyvinyl N-hexadecyl carbamate; dodecanoic acid; octadecanoic acid, octadecyl amine, octadecanol; and the like. The term (higher) alkyl as used herein refers to alkyls having at least 12 carbon atoms in the alkyl groups, e.g. from 12 to 22 carbon atoms.

After addition of the (higher) alkyl to the polysiloxane and titanate reaction product, the solution is coated on to a tape or sheet and the solvent is evaporated therefrom, e.g. by heating to a temperature above 250° F. to form the release coating of this invention.

The organopolysiloxane; or simply polysiloxane, used in this invention has silicon-bonded hydroxyl groups. Preferably such hydroxyl groups are of terminal silicon-bonded hydroxyl groups. Such polysiloxanes are well known. Illustratively U.S. Patent 2,970,126 of Jan. 31, 1961 describes suitable polysiloxanes which are linear high viscosity fluids having a viscosity above 200,000 centipoises and which contain terminal silicon-bonded hydroxyl groups.

The organic groups of this fluid are attached to silicon by carbon-silicon linkages and such organic groups can be monovalent hydrocarbon groups and halogenated aryl radicals, there being present about 2 organic groups per silicon atom in the fluid. A more detailed description of the polysiloxanes of U.S. Patent 2,970,126 is found in columns 4 to 6 of that patent. Still another patent which describes a different, but suitable, polysiloxane is U.S. Patent 3,028,347 which issued on Apr. 3, 1962. This 347 patent describes such polysiloxanes as being in the partially condensed state having a ratio of about 1.2 to 1.6 hydrocarbon groups per silicon atom and which contain an average of 0.5% to 2.5% by weight of hydroxyl group based on the dry partially condensed polysiloxane. Illustrative of suitable polysiloxanes are methyl polysiloxane, ethyl polysiloxane and phenyl polysiloxane. Still additional polysiloxanes suitable for use in this invention are described in U.S. 2,724,704 of Nov. 22, 1955 and U.S. 2,663,694 of Dec. 22, 1953. The only requirements for suitability of the polysiloxanes for use in this invention is that they are soluble in aromatic organic solvents so as to form a varnish, have the hydroxyl groups and preferably that the polysiloxane is capable of curing to a solid in the presence of conventional catalysts, e.g. ethylene diamine.

The organic titanate compounds which are used in this invention are titanium esters such as those having the general formula $Ti(OR)_4$ wherein R represents an aliphatic hydrocarbon radical of less than about 12 carbon atoms and/or hydroxylated aliphatic hydrocarbon radicals of less than about 12 carbon atoms and containing less than 4 hydroxyl radicals and/or partially hydrolyzed $Ti(OR)_4$ compounds that are substantially soluble in aromatic solvents. The various (OR) groups on any one Ti atom can be the same or different. Examples of titanium compounds operative herein are tetramethyl titanate, tetraethyl titanate, tetrabutyl titanate, tetradecyl titanate, octylene glycol titanate and the like. Preferably the R groups of the titanium ester are alkyls having from 1 to 4 carbon atoms.

The drawings in this application illustrate a suitable pressure sensitive tape or sheet of this invention.

Referring now to the drawings.

Figure 1:
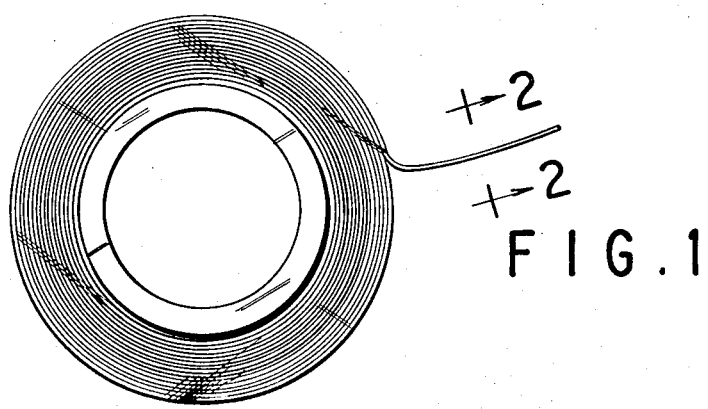
FIG. 1 shows a pressure sensitive roll of a sheet or tape which can carry the release coat of this invention.
Figure 2:
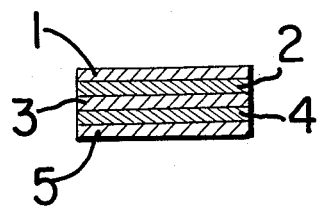
FIG. 2 is a cross-section of the tape taken on the line 2—2 of FIG. 1.
Figure 3:
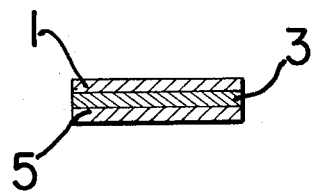
FIG. 3 is a cross-section of a tape illustrating a different embodiment from that in FIG. 2.

In FIG. 2 of the drawings the numeral 1 shows a coating of a conventional pressure sensitive adhesive which is coated over a base coat 2 on a tape substrate or backing 3 wherein said substrate or backing can be porous or non-porous. On the opposite side of the backing 3 is a base release coat 4 and the release coat 5 of this invention. The construction of the tape in FIG. 2 is similar to that of FIG. 1 except that it contains only the pressure sensitive adhesive 1 and the release coat 5 adhered to opposite sides of backing 3. The terms tape and sheet are used interchangeably in this invention since the roll or flat article of this invention can be considered as a tape or sheet.

The following examples are illustrative of the invention.

Example 1

To a vigorously agitating 14% solids solution of Dow Corning Organosiloxane Varnish 901 [1] in aromatic solvent, rapidly add a 20% solids aromatic organic solvent solution of Tyzor PB.[2] The resultant solution contains

| | Parts by weight |
|---|---|
| Dow Corning 901 Varnish (50% solids) | 89 |
| Tyzor PB | 11 |
| Aromatic solvent to give 15% solids. | |

To the above 15% solids solution, there added 15%, by weight, based on solids in said solution of polyvinyl N-octadecyl carbamate. The resulting solution is then coated on one side of glass cloth backing having a pressure sensitive adhesive on the other side thereof. The tape is then heated to a temperature of about 270° F. to evaporate the solvent to give a solid coating.

Example 2

A glass cloth tape with a thermosetting acrylic pressure sensitive adhesive can be prepared from the novel release coat of this invention by employing the below given coating solutions wherein the release coating is made by substantially the same procedure as that of Example 1.

(A) Pressure sensitive adhesive coating 1

| | Pts. |
|---|---|
| Catalin acrylic resin solution 1085 (35% solids) | 65.3 |
| Monsanto multipolymer D263 (45% solids) | 27.3 |
| BASF 2156 acrylic resin (25% solids) | 7.4 |
| Additional aromatic solvent to give 32.5% solids. | |

(B) Base coating 2

| | Pts. |
|---|---|
| Polymer Corp. Krynac 833–1 isoprene acrylonitrile copolymer (2/1) | 31 |
| Monsanto multipolymer D263 (45% solids) | 63 |
| Mixture of ketone and aromatic solvent to give 25% solids. | |

(C) Base release coating 4

| | Pts. |
|---|---|
| Polymer Corp. Krynac 882–1 acrylic rubber | 33.7 |
| Rohm and Haas Acryloid AT–56 (50% solids) | 51.0 |
| Rohm and Haas U formite MM 57 (50% solid) | 15.3 |
| Mixture of ketone and aromatic solvent to give 11% solids. | |

(D) Release coating 5

| | Pts. |
|---|---|
| Dow Corning 901 Varnish (50% solids) | 84.3 |
| DuPont Tyzor PB | 10.5 |
| Polyvinyl N-octadecylcarbamate | 5.2 |
| Aromatic solvent to give 6 to 12% solids. | |

In conventional tape coating equipment the base coat 2 is applied to a glass cloth at a coating weight of 25 lbs./ream. The base release coat 4 is applied at 3 lbs./ream and the pressure sensitive adhesive is coated at 50 lbs./ream. The release coating 5 can be doctored on with a Number 4 Mayer Bar from solutions ranging in solids content from 6 to 12% without substantial change in tape properties. The coated glass cloth is dried at approximately ---
[1] This varnish is sold as a 50% solids solution.
[2] Tyzor PB is a trademark of Du Pont de Nemours for orthotitanate esters, in solid form, as described in this application.

250° F. for 3 minutes, before winding the web and slitting into rolls. The properties given by such tapes are listed in Table I.

TABLE I

Panel adhesion (room temperature)—36–51 oz./in. width
Panel adhesion (aged 2 wks. at 120° F.)—34–44 oz./in. width
Unwind force (room temperature)—18–21 oz./in. width
Unwind force (aged 2 wks. at 120° F.)—19–24 oz./in. width
Flagging to backing (⅛ in. rod—14 days R.T.)—none
Flagging to backing (⅛ in. rod—2 hrs. 320° F.)—none
Bond separation after cure (cure 4 hrs. at 320° F.) face to backing specimens ½″ x ½″ overlap then suspend 4000 gr./sq. in.—30+ minutes Example 3

A glass cloth tape with a natural rubber based pressure sensitive adhesive can be prepared from the novel release coat of this invention by employing the below given coating solutions wherein the release coating is made by substantially the same procedure as shown in Example 1.

(A) Pressure sensitive adhesive coating 1

| | Pts. |
|---|---|
| Pale crepe natural rubber | 44.50 |
| Pentalyn H | 28.55 |
| Amherol ST 137 (Phenolic) | 19.05 |
| Zinc resinate | 4.75 |
| Titanium dioxide | 2.25 |
| Santovar A antioxidant | 0.9 |

Dissolve in sufficient aromatic solvent to give 40% solids.

(B) Base coating 2

| | Pts. |
|---|---|
| Natural rubber pale crepe | 66.92 |
| Phenolic resin (Schnectady SP 1045) | 12.24 |
| Aluminum hydrate | 10.04 |
| Zinc resinate | 6.12 |
| Titanium dioxide | 3.34 |
| Santovar A antioxidant | 1.34 |

Dissolve in sufficient aromatic solvent to give 25% solids.

(C) Base release coating 4

| | Pts. |
|---|---|
| Hughson Chemical Co. Chemlok 216 (22%) | 100 |

(D) Release coating 5

| | Pts. |
|---|---|
| Dow Corning 901 Varnish (50% solids) | 80.6 |
| Du Pont Tyzor PB | 10.0 |
| Polyvinyl N-octadecylcarbamate | 9.4 |

Aromatic solvent to give 6% solids.

In conventional tape coating equipment the base coat 2 is applied to a glass cloth at a coating weight of 12 lbs./ream. The base release coat 4 is applied at 5 lbs./ream and the pressure sensitive adhesive is coated at 46 lbs./ream. The release coating 5 can be doctored on with a No. 4 Mayer Bar from a 6% solution. The coated glass cloth is dried at approximately 300° F. for 3 minutes, before winding the web and slitting into rolls. The properties given by such a tape are listed in Table II.

TABLE II

| | Oz./in. width |
|---|---|
| Panel adhesion (room temperature) | 47–50 |
| Panel adhesion (aged 2 weeks at 120° F.) | 47–48 |
| 90° tack (room temperature) | 25–30 |
| 90° tack (aged 2 weeks at 120° F.) | 27–33 |
| Unwind force (room temperature) | 20–21 |
| Unwind force (aged 2 weeks at 120° F.) | 15–21 |

Example 4

A glass cloth tape with a silicone pressure sensitive adhesive can be prepared from the novel release coat of this invention by employing the following coating solutions.

(A) Pressure sensitive adhesive coating 1

| | Pts. |
|---|---|
| General Electric Silicon Gum SE52 | 67.8 |
| CR 526 Silicone Resin (G.E.) (60% solids) | 32.2 |

Aromatic solvent to give 60% solids. Based on solids 1.7% benzoyl peroxide is added to initiate cure.

(B) Base coating 2

| | Pts. |
|---|---|
| Union Carbide Silicone Rubber Dispersion KS–1983 (38%) | 84 |
| CR 526 Silicone Resin (60%) | 16 |

Aromatic solvent to give 33% solids. Based on solids 3% benzoyl peroxide is added to initiate cure.

(C) Base release Coating 4

| | Parts |
|---|---|
| Union Carbide Silicon Rubber Dispersion KS–1983 (38%) | 100 |

Based on soilds 4% benzoyl peroxide is added to initiate cure.

(D) Release coating 5

Composition of Example 1.

In conventional tape coating equipment the base coat is applied to a glass cloth at a coating weight of 14 lbs./ream. The base release coat 4 is applied at 20 lbs./ream and the pressure sensitive adhesive 1 is applied at 50 lbs./ream. The release coating 5 can be doctored on with a No. 4 Mayer Bar. The coated glass cloth is dried at approximately 350° F. for 3 minutes before winding the web and slitting into rolls. The properties given by such a tape are listed in Table III.

TABLE III

Panel adhesion (room temperature)—22–33 oz./in. width
Panel adhesion (aged 2 weeks at 140° F.)—23–33 oz./in. width
Unwind force (room temperature)—30–50 oz./in. width
Unwind force (aged 2 weeks at 140° F.)—30–50 oz./in. width
Flagging to backing (⅛ in. rod 14 days room temperature)—0.125 in. max.

Example 5

A glass cloth tape with a thermosetting acrylic pressure sensitive adhesive can be prepared from the novel release coat of this invention by employing the following coating solutions:

(A) Pressure sensitive adhesive coating 1

| | Pts. |
|---|---|
| RA 657 Monsanto Acrylic Resin Solution (30%) | 76.9 |
| Polybond GA–59A polyester resin (75%) | 13.2 |
| Piccolastic A–50 | 9.9 |

(B) Base coating 2

| | Pts. |
|---|---|
| RA 657 Monsanto Acrylic Resin Solution (30%) | 86.60 |
| Polybond GAé59A Polyester Resin (75%) | 8.65 |
| Silica (Cabosil M–5) | 4.75 |

(C) Base release coating 4

| | Pts. |
|---|---|
| Polymer Corp. Krynac 882–1 Acrylic Rubber | 60.6 |
| Rohm and Haas Acryloid AT 56 (50%) | 30.3 |
| Rohm and Haas U Formite MM57 (50%) | 9.1 |

Mixture of ketone and aromatic solvent to give 12.5% solids.

(D) Release coating 5

| | Pts. |
|---|---|
| Dow Corning 901 Varnish (50% solids) | 77.5 |
| Du Pont Tyzor PB | 19.2 |
| Polyvinyl N-octadecyl carbamate | 3.3 |
| Addition of aromatic solvent to give 6% solids. | |

In conventional tape coating equipment the base coat 2 is applied to a glass cloth at a coating weight of 24 lbs./ream. The base release coat 4 is applied at 4 lbs./ream and the pressure sensitive adhesive is coated at 43 lbs./ream. The release coating can be doctored on with a No. 4 Mayer Bar from a 6% solids solution. The coated glass cloth is dried at 250° F. for 3 minutes, before winding the web and slitting into rolls. The properties given by such a tape are listed in Table IV.

TABLE IV

Panel adhesion (room temperature)—64 oz./in. width
Panel adhesion (12 days at 1720° F.)—50 oz./in. width
Unwind force (room temp.—12 in./min.)—50–70 oz./in. width
Unwind Force (room temp.—50 in./min.—55 oz./in. width
Unwind force (room temp.—160 ft./min.)—20 oz./in. width
Unwind force (age 2 wks. 120° F.—12 in./min.)—55–70 oz./in. width
Bond separation after cure (2 hrs. at 266° F.; face to backing specimens ½" x ½" overlap. Then suspend 4000 g./sq. in. at 266° F.) 30+ min.

Example 6

A polyimide tape with a silicone pressure sensitive silicone adhesive can be prepared from the release coat of this invention by employing the following coating solutions:

(A) Pressure sensitive adhesive coating 1

| | Pts. |
|---|---|
| General Electric CR526 silicone resin (60% solids) | 62.5 |
| General Electric CR528 methyl phenyl silicone gum | 37.5 |
| Aromatic solvent to give 35% solids. | |
| Curative: 1.25% benzoyl peroxide based on solids. | |

(B) Base coating 2

| | Pts. |
|---|---|
| General Electric CR526 silicone resin (60% solids) | 58 |
| General Electric methyl phenyl silicone gum | 35 |
| Tetrabutyl titanate | 7 |
| Aromatic solvent to give 35% solids. | |
| Curative: 1.9% benzoyl peroxide based on solids. | |

(C) Release coating 5

Composition of Example 2.

On conventional tape coating equipment the base coat 2 is applied to a one mil polyimide film (Du Pont Kapton) at a coating weight of 8 lbs./ream and cured for 3 minutes at 350° F. The release coat 5 is then applied to the backside of the web with a Number 4 Mayer Bar from solutions ranging in solids content from 1 to 12% without substantial change in tape properties. The pressure sensitive adhesive 1 is applied over the base coat at 13 lbs./ream. After drying at low temperatures to remove solvent, the coated web is again cured at a temperature of 350° F. for 3 minutes before winding the web into master cylinders and slitting into rolls. The tape produced could be slit at all commonly used cameron speeds without adhesive transfer and physical test data show no detackification or loss of adhesion due to the presence of the release coating. The unwind was smooth at all rates of unwind commonly used in the pressure sensitive industry. Comparative unwinds values at a 12 inches per minute rate of unwind show that the release coated construction of this example had an unwind 20 oz./in. compared to 30 oz. a control without release coat. The most important benefits of our release coated construction was the fact that slitting could be done at all speeds without adhesive transfer and a smooth uniform unwind resulted at all standard rates of peel. The physical properties of the tape produced as instructed in Example 5 are given in Table V.

TABLE V

Panel adhesion (room temperature)—14 oz./in. width
Panel adhesion (aged 2 weeks at 120° F.)—15 oz./in. width
Ball tack (room temperature)—¾ to 1 inch
Ball tack (aged 2 weeks at 120° F.)—¾ to 1 inch
Unwind force (room temperature)—(oz./inch)

| | Oz./in. width |
|---|---|
| 1 inch/min. | 15 |
| 5 inch/min. | 18 |
| 12 inch/min. | 20 |
| 16 feet/min. | 23 |
| 60 feet/min. | 20 |
| 160 feet/min. | 17 |

Unwind force (aged 2 weeks at 120° F.)—(oz./inch)

| | Oz./in. width |
|---|---|
| 1 inch/min. | 15 |
| 5 inch/min. | 18 |
| 12 inch/min. | 21 |
| 16 feet/min. | 27 |
| 60 feet/min. | 23 |
| 160 feet/min. | 19 |

Example 7

An aluminum foil tape with an acrylic adhesive can be prepared from the release coat of this invention by employing the following coating solutions:

(A) Pressure sensitive adhesive coating 1
The composition of Example 2.

(B) Release coating 5
The composition of Example 2.

On conventional tape coating equipment the pressure sensitive coating is applied to two mil type 3003–0 aluminum foil at a dried coating weight of 27 lbs./ream. The release coating is applied to the backside of the web with a Number 4 Mayer Bar from solutions ranging in solids content from 1 to 12%. The coated web is dried at 250° F. for 3 minutes. The coated web is then slit into rolls.

Rolls of tape show no detackification or loss of adhesion on aging due to the presence of our new release coats. Former release coats such as polyvinyl N-octadecylcarbamate or polyvinyl behenate can only be applied to metal foils in extremely thin coatings with Mayer Bars smaller than a No. 4 and at solids below 2 percent to avoid detackification of the adhesive due to poor adhesion of the release coats to metal. The release coats of this invention adhere so well to metal foils that it is possible to coat a high solids and with larger Mayer bars which insure that the coating is applied as a continuous film. In addition the normal release coats of the past art gives what is described as a zip type release. Zip type release coats are those that give greatly decreased unwind as the speed of unwind increases. For aluminum foil it is desirable to have a moderately high unwind which does not change significantly with increasing speed, to insure that the tape comes out of the roll with a smooth wrinkle free surface. The release coats of our invention gives this type of smooth high unwind which are particularly suited to metal foils. The properties given by the aluminum foil tape of this example are listed in Table VI.

TABLE VI

Panel adhesion (room temperature)—56 oz.
Panel adhesion (aged 2 wks. at 120° F.)—58 oz.
Ball tack (room temperature)—½–1 inch
Ball tack (aged 2 wks. at 120° F.)—½–1 inch
Unwind force (room temperature)—(ozs./inch)

|  | Oz. |
|---|---|
| 1 inch/min. | 35 |
| 5 inch/min. | 30 |
| 12 inch/min. | 32 |
| 16 feet/min. | 35 |
| 60 feet/min. | 29 |
| 160 feet/min. | 20 |

Unwind force (aged 2 wks. at 120° F.)—(oz./inch)

|  | Oz. |
|---|---|
| 1 inch/min. | 34 |
| 5 inch/min. | 40 |
| 12 inch/min. | 33 |
| 16 feet/min. | 30 |
| 60 feet/min. | 25 |
| 160 feet/min. | 20 |

Example 8

An aromatic polyamide synthetic paper (Du Pont type 410 Nomex) tape with a thermosetting acrylic adhesive can be prepared from the release coat of this invention by employing the following coating solutions.

(A) Pressure sensitive adhesive coating 1

The composition of Example 2.

(B) Release coating 5

The composition of Example 2.

The processing used is the same as used for Example 6.
Testing of slit rolls of tape showed good bonding of our release coat to the hard to bond to Nomex paper and no loss in adhesion or detackification of the adhesive occurred on aging. In addition our release coat provided an unwind value at all commonly used unwind speeds low enough to avoid delamination of the easy to delaminate Nomex backing. Even though unwinds are low our release coat provides a bondable surface for thermosetting our adhesive to the back of the tape upon curing at elevated temperatures. The properties given by the Nomex tape of this example are listed in Table VII.

TABLE VII

Panel adhesion (room temperature)—38–48 ozs.
Panel adhesion (aged 2 wks. at 120° F.)—41–48 ozs.
Ball tack (room temperature)—1 inch
Ball tack (aged 2 wks. at 120° F.)—1 inch
Unwind force (room temperature)—(ozs./inch)

| 1 inch/min. | 5 |
|---|---|
| 5 inch/min. | 7 |
| 12 inch/min. | 12 |
| 16 feet/min. | 3 |
| 60 feet/min. | 3 |
| 160 feet/min. | 3 |

Unwind force (aged 2 wks. at 120° F.)—(ozs./inch)

| 1 inch/min. | 16 |
|---|---|
| 5 inch/min. | 21 |
| 12 inch/min. | 30 |
| 16 feet/min. | 12 |
| 60 feet/min. | 12 |
| 160 feet/min. | 10 |

Thermoset to backing (cure 1 hr. at 180° C., 1600 gr./sq. in. suspended at 160°C.) (hold minutes)—30+

Example 9

A polyethylene terephthalate film tape with an acrylic adhesive can be prepared from the release coat of this invention by employing the following coating solution:

(A) Pressure sensitive adhesive coating 1

The composition of Example 2.

(B) Release coating 5

The composition of Example 2.

The processing used is the same as used for Example 7.
The testing of slit rolls of tape showed no detackification of our adhesive and a low level of unwind at all commonly used unwind speeds. The properties given by the polyethylene terephthalate film tape of this example are listed in Table VIII.

TABLE VIII

Panel adhesion (room temperature)—35 ozs.
Panel adhesion (aged 2 wks. at 120° F.)—35 ozs.
Ball tack (room temperature)—1 inch
Ball tack (aged 2 wks. at 120° F.)—1 inch
Unwind force (room temperature)—(oz./inch)

| 1 foot/min. | 8 |
|---|---|
| 16 feet/min. | 4 |
| 60 feet/min. | 4 |
| 160 feet/min. | 2 |

Unwind force (aged 2 wks. at 120° F.)—(ozs./inch)

| 1 foot/min. | 8 |
|---|---|
| 16 feet/min. | 4 |
| 60 feet/min. | 4 |
| 160 feet/min. | 3 |

Example 10

A polyethylene terephthalate tape with a high smooth unwind which is sometimes desirable can be manufactured by using the coatings and processing of Example 8 but substituting the following release coat:

(A) Release coating 5

|  | Parts |
|---|---|
| Hydroxy terminated polyester (USM 1021E) | 86.9 |
| Polyvinyl N-octadecylcarbamate | 8.7 |
| Methylene bis 4-phenyl isocyanate | 4.4 |

Aromatic solvent to give 1 to 12% solids.

The properties given by the polyethylene terephthalate film tape using the release coat of this example are listed in Table IX.

TABLE IX

Panel adhesion (room temperature)—40 ozs.
Panel adhesion (aged 2 wks. at 120° F.)—40 ozs.
Ball tack (room temperature)—1 inch
Ball tack (aged 2 wks. at 120° F.)—1 inch
Unwind force (room temperature)—(ozs./inch)

| 1 foot/min. | 20 |
|---|---|
| 16 feet/min. | 9 |
| 60 feet/min. | 5 |
| 160 feet/min. | 5 |

Unwind force (aged 2 wks. at 120° F.)—(ozs./inch)

| 1 foot/min. | 28 |
|---|---|
| 16 feet/min. | 15 |
| 60 feet/min. | 13 |
| 160 feet/min. | 12 |

Example 10

A paper tape with a sulfur cured rubber pressure sensitive adhesive mass can be made from the release coat of this invention by employing the following coating solutions.

(A) Pressure sensitive adhesive coating 1

| | Pts. |
|---|---|
| Pentaerythritol ester of hydrogenated rosin (Pentalyn H) | 42.1 |
| Crude rubber (No. 1 ribbed smoked sheet) | 38.3 |
| Zinc oxide | 9.6 |
| Zinc resinate | 3.8 |
| Polyisobutylene (Vistanex LMMH) | 3.8 |
| Methyl zimate | 1.7 |
| N-phenylbetanaphthylamine | 0.4 |
| N,N'-diphenyl-p-hexylenediamine | 0.2 |
| Zinc-2-benzamidothiphenate | 0.1 |

On a two roll mill blend into the rubber all the ingredients except the tackifiers and mill to a Mooney of 40. Dissolve the mill batch with the remaining ingredients in a mixture of aromatic and aliphatic solvent sufficient to give 42% solids. Prior to use 1.3% on solids of dipentamethylene thiuram tetrasulfide is added as a curative.

(B) Base coating 2

| | Pts. |
|---|---|
| Neoprene Type W | 45.4 |
| Alpha-polyterpene resin (M.P. 115° C.) | 22.4 |
| Pentalyn H | 20.5 |
| Zinc oxide | 6.8 |
| Magnesium oxide | 4.5 |
| Superlite | 0.5 |

Aromatic solvent to give 39.5% solids.

(C) Release coating 5

Composition of Example 2.

On conventional tape coating equipment, a web composed of a one side creped styrene-butadiene latex impregnated paper coated on the non creped side with 3 to 5 lbs. per ream of vinyl acrylic type latex base release coat can be converted to a pressure sensitive tape using the coatings of this example. The base coat 2 is applied to the creped side of the web at a dried coating weight of 5 lbs./ream. After solvent removal, the pressure sensitive adhesive coating 1 is applied over the base coat at a dried coating weight of 22 lbs./ream. Before curing for 3 minutes at 275° F., the release coating 5 of this invention is applied to the latex treated side of the web with a No. 9 Mayer Bar. The cured web can be wound into master cylinders before being slit into conventional tape rolls. The tape produced has a high smooth unwind and is suitable for masking purposes. The release coating prevents delamination of the backing or transfer of the adhesive on unwinding. Aging of the tape shows no deleterious effect produced by the presence of the release coat. The physical properties of the tape are listed in Table X.

TABLE X

Panel adhesion (room temperature)—37 oz.
Panel adhesion (aged 2 wks. at 120° F.)—37 oz.
Ball tack (room temperature)—0.5 inch
Ball tack (aged 2 wks. at 120° F.)—0.5 inch
Unwind force (room temperature) (oz./inch)

| | |
|---|---|
| 1 foot/min. | 18 |
| 16 feet/min. | 27 |
| 60 feet/min. | 31 |
| 160 feet/min. | 25 |

Unwind force (aged 2 wks. at 120° F.)—(oz./inch)

| | |
|---|---|
| 1 foot/min. | 18 |
| 16 feet/min. | 30 |
| 60 feet/min. | 38 |
| 160 feet/min. | 38 |

Example 12

Equally satisfactory properties can be obtained on the paper tape of Example 10 by substituting the release coating below for the one used on the tape of Example 10.

(A) Release coating 5

Composition of Example 10.

The properties given by this tape are listed in Table XI.

TABLE XI

Panel adhesion (room temperature)—34 oz.
Panel adhesion (aged 2 wks. at 120° F.)—30 oz.
Ball tack (room temperature)—0.5 inch
Ball tack (aged 2 wks. at 120° F.)—0.5 inch
Unwind force (room temperature)—(oz./inch)

| | |
|---|---|
| 1 foot/min. | 23 |
| 16 feet/min. | 32 |
| 60 feet/min. | 37 |
| 160 feet/min. | 32 |

Unwind force (aged 2 wks. at 120° F.)—(oz./inch)

| | |
|---|---|
| 1 foot/min. | 22 |
| 16 feet/min. | 35 |
| 60 feet/min. | 44 |
| 160 feet/min. | 50 |

Example 13

Following the procedure of Example 1, a release coating composition can be employed by substituting in place of the Dow-Corning 901 Varnish equal quantities and dilutions of General Electric 224 silicon Varnish or General Electric SR702 silicone acrylic varnish.

Parts and precentages given herein are on a weight basis unless otherwise indicated.

Dow Corning varnish 901 used in the examples herein is a methyl-phenyl-polysiloxane resin having a phenyl to silicon ratio of 0.478 to 1 and a methyl to silicon ratio of 0.82 to 1 and is further described in U.S. Pat. 2,906,734.

What is claimed is:

1. A pressure sensitive adhesive tape having on one side a pressure sensitive adhesive selective selected from any of the normal types based on silicone, natural or synthetic rubber, acrylics or polyvinyl methyl ethers, and on the other side thereof a release coating consisting essentially of the dried residue from an admixture of a member selected from the group consisting essentially of polyvinyl N-octadecyl carbamate, polyvinyl N-hexadecyl carbamate, dodecanoic acid, octadecanoic acid, octadecyl amine, and octadecanol with the reaction product of an organic titanate with a polysiloxane having terminal hydroxyl groups.

2. A pressure sensitive tape of claim 1, wherein the organic titanate is of the formula $Ti(OR)_4$, wherein R is alkyl of 1 to 4 carbon atoms and the higher alkyl compound is polyvinyl N-octadecyl carbamate.

References Cited

UNITED STATES PATENTS

| | | | |
|---|---|---|---|
| 3,028,347 | 4/1962 | Chevalier | 260—18 |
| 3,334,067 | 8/1967 | Weyenberg | 117—161 X |
| 3,151,099 | 9/1964 | Ceyzeriat et al. | 117—161 X |
| 2,882,183 | 4/1959 | Bond et al. | 117—68.5 |
| 2,732,318 | 1/1956 | Keil | 117—68.5 |
| 3,518,325 | 6/1970 | Campbell et al. | 117—161 X |

WILLIAM D. MARTIN, Primary Examiner

B. D. PIANALTO, Assistant Examiner

U.S. Cl. X.R.

117—4, 76 A, 122 P, PF, 126 GS, 135.1, 138.8 F, 161 ZA; 206—59

UNITED STATES PATENT OFFICE
CERTIFICATE OF CORRECTION

Patent No. 3,679,458    Dated July 25, 1972

Inventor(s) Henry P. Sorell et al.

It is certified that error appears in the above-identified patent and that said Letters Patent are hereby corrected as shown below:

Column 4, line 22 should read -- To the above 15% solids solution, there is added 15%, --; line 47, "63" should read -- 69 --. Column 6, line 23, "soilds" should read -- solids --; line 66, "GAé59A" should read -- GA-59A --. Column 7, line 20, "1720°F" should read -- 120° F --.

Signed and sealed this 2nd day of January 1973.

(SEAL)
Attest:

EDWARD M. FLETCHER, JR.
Attesting Officer

ROBERT GOTTSCHALK
Commissioner of Patents